(12) United States Patent
Seguchi et al.

(10) Patent No.: US 10,752,796 B2
(45) Date of Patent: Aug. 25, 2020

(54) WATER-BASED INKJET INK COMPOSITION

(71) Applicants: Seiko Epson Corporation, Tokyo (JP); Mitsui Chemicals, Inc., Tokyo (JP)

(72) Inventors: Kenichi Seguchi, Okaya (JP); Tsuyoshi Sano, Shiojiri (JP); Miharu Kanaya, Azumino (JP); Takayoshi Kagata, Shiojiri (JP); Akira Mizutani, Matsumoto (JP); Toshihiro Yoshimura, Ichihara (JP); Yasuyuki Kagawa, Ichihara (JP)

(73) Assignees: Seiko Epson Corporation (JP); MITSUI CHEMICALS, INC. (JP)

(*) Notice: Subject to any disclaimer, the term of this patent is extended or adjusted under 35 U.S.C. 154(b) by 0 days.

(21) Appl. No.: 16/246,785

(22) Filed: Jan. 14, 2019

(65) Prior Publication Data

US 2019/0218405 A1 Jul. 18, 2019

(30) Foreign Application Priority Data

Jan. 15, 2018 (JP) .................................. 2018-004017

(51) Int. Cl.
*C09D 11/30* (2014.01)
*C09D 11/033* (2014.01)
*C09D 11/106* (2014.01)
*C09D 11/107* (2014.01)
*C09D 11/322* (2014.01)
*C09D 11/38* (2014.01)

(52) U.S. Cl.
CPC ............ *C09D 11/30* (2013.01); *C09D 11/033* (2013.01); *C09D 11/106* (2013.01); *C09D 11/107* (2013.01); *C09D 11/322* (2013.01); *C09D 11/38* (2013.01)

(58) Field of Classification Search
None
See application file for complete search history.

(56) References Cited

U.S. PATENT DOCUMENTS 9,353,276 B2 * 5/2016 Yatake ................ C09D 11/322
2005/0174408 A1 8/2005 Qingguo et al.
2012/0038719 A1 2/2012 Shimizu et al.
(Continued)

FOREIGN PATENT DOCUMENTS

JP 2005-219483 A 8/2005
JP 2011-094082 A 5/2011
(Continued)

OTHER PUBLICATIONS

Belmares et al., Journal of Computational Chemistry, 25(15), 1814-1826.*
(Continued)

*Primary Examiner* — Vu A Nguyen
(74) *Attorney, Agent, or Firm* — Harness, Dickey & Pierce, P.L.C.

(57) ABSTRACT

A water-based inkjet ink composition comprising composite resin fine particles composed of a first resin and a second resin, and having an SP value of from 9.0 to 12.0 $(cal/cm^3)^{1/2}$, wherein the SP value of the second resin is higher than the SP value of the first resin, and the first resin has a higher mass than the second resin.

24 Claims, 1 Drawing Sheet

(56) References Cited

U.S. PATENT DOCUMENTS

2015/0247045 A1    9/2015   Yatake et al.
2017/0283639 A1   10/2017   Seguchi et al.

FOREIGN PATENT DOCUMENTS

| JP | 2012-051309 A | 3/2012 |
| JP | 2015-160931 A | 9/2015 |
| JP | 2017-186442 A | 10/2017 |

OTHER PUBLICATIONS

Sigma-Aldrich's Reference: Polymer Properties, Polymer Solutions: Solvents and Solubility Parameters (continued), Table IV, available at https://www.sigmaaldrich.com/content/dam/sigm-aldrich/docs/SAJ/Brochure/1/j_polymer_solutions.pdf (Year: 1999).*
Poly(benzyl acrylate) data by polymerdatabase.com available at http://polymerdatabase.com/polymers/polybenzylacrylate.html (Year: NA).*

* cited by examiner

WATER-BASED INKJET INK COMPOSITION

Japanese Patent Application No. 2018-004017 filed on Jan. 15, 2018 is hereby incorporated by reference in its entirety.

BACKGROUND OF THE INVENTION

The present invention relates to a water-based inkjet ink composition.

Inkjet recording methods allow high-definition images to be recorded with relatively simple equipment, and rapid developments have been achieved in various areas. Due to revolutionary developments in inkjet recording system technology in recent years, printing methods employing inkjet recording systems are now being used even in areas of high-definition image recording for which photography and offset printing were traditionally used. In particular, there have been various proposals for inks capable of recording high-quality images on ink non-absorbing and low-absorbing recording media.

However, images recorded on ink non-absorbing and low-absorbing recording media may not be sufficiently abrasion resistant because the coloring material has a hard time penetrating the interior of the recording medium. Therefore, there has been research into improving abrasion resistance by adding to the ink resin fine particles that form a coating on the surface of the image (see for example JP-A-2015-160931).

However, because the resin fine particles contained in the ink composition disclosed in JP-A-2015-160931 are for purposes of forming a coating on the surface of the image, they normally have the property of adhering easily. Thus, problems of poor discharge stability can occur when the resin fine particles in an ink composition contained in an inkjet head once dissolve and adhere to the wall surface or the like of the inkjet head, preventing normal ink discharge. That is, there is a trade-off between the discharge stability of the ink and the abrasion resistance of the image, and therefore demand for an ink composition that can achieve both.

SUMMARY

By resolving at least some of the problems described above, the invention provides a water-based inkjet ink composition (hereunder sometimes called simply an "ink composition") providing both good abrasion resistance of an image recorded on a recording medium and good discharge stability from the nozzle of an inkjet head, together with an inkjet recording method using this ink composition.

According to one aspect of the invention, there is provided a water-based inkjet ink composition containing a composite resin fine particle composed of a first resin and a second resin, and having an SP value of 9.0 to 12.0 $(cal/cm^3)^{1/2}$, wherein the SP value of the second resin is higher than the SP value of the first resin, and the first resin has a higher mass than the second resin.

DETAILED DESCRIPTION OF THE EMBODIMENT

Figure 1:
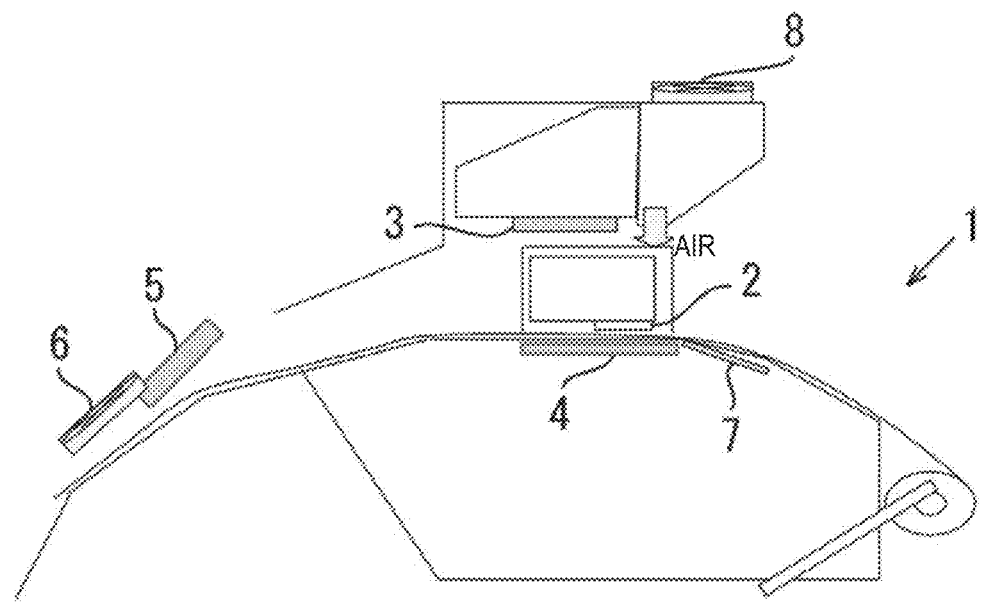
FIG. 1 is a schematic sectional view illustrating an inkjet recording device.

The invention, which was developed to resolve at least some of the problems described above, can be implemented in the form of the following application examples.

Application Example 1

One application example of the water-based inkjet ink composition of the invention is as follows.

A water-based inkjet ink composition comprising composite resin fine particles composed of a first resin and a second resin, and having an SP value (solubility parameter) of from 9.0 to 12.0 $(cal/cm^3)^{1/2}$, wherein the SP value of the second resin is higher than the SP value of the first resin, and the first resin has a higher mass than the second resin.

With the ink composition of the Application Example 1, continuous discharge stability is good. The image also has good abrasion resistance. That is, it is possible to achieve both good continuous discharge stability of the ink and good abrasion resistance of the image.

Application Example 2

In the above water-based inkjet ink composition, the SP value of the second resin may be from 11.0 to 12.0 $(cal/cm^3)^{1/2}$, and the SP value of the first resin is from 9.0 to 11.5 $(cal/cm^3)^{1/2}$.

Application Example 3

In either of the above water-based inkjet ink compositions, the glass transition temperature of the first resin may be from 60° C. to 95° C.

Application Example 4

In any of the above water-based inkjet ink composition, the mass ratio of the second resin to the first resin (mass of second resin/mass of first resin) may be from 1/11 to 1/2 in the composite resin fine particle.

Application Example 5

In any of the above water-based inkjet ink compositions, the average particle diameter of the composite resin fine particle may be from 100 to 300 nm.

Application Example 6

In any of the above water-based inkjet ink composition, the acid value of the composite resin fine particle may be from 5 to 35 mgKOH/g.

Application Example 7

In any of the above water-based inkjet ink compositions, the composite resin fine particle may have a phase separation structure of the first resin and second resin.

Application Example 8

In any of the above water-based inkjet ink compositions, the phase separation structure may be at least either a core-shell structure in which the first resin forms the shell and the second resin forms the core, or a sea-island structure in which the second resin is present in the form of islands in the first resin.

Application Example 9

Any of the above water-based inkjet ink compositions, may further contain a cyclic amide as an organic solvent.

Application Example 10

In any of the above water-based inkjet ink compositions, the content of an organic solvent with a standard boiling point above 280° C. may be equal to or less than 5 mass %, and the water-based inkjet ink composition may further contain an organic solvent with a standard boiling point of from 150° C. to 260° C.

Preferred embodiments of the invention are explained below. The embodiments explained below explain one example of the invention. The invention is not limited to the following embodiments, and various modifications can be made within the scope of the invention. "(Meth)acrylic acid" in the Description is a concept that encompasses both "acrylic acid" and "methacrylic acid". Similarly, "-(meth) acrylate" is a concept that encompasses both "-acrylate" and "-methacrylate".

1. Water-Based Inkjet Ink Composition

The water-based inkjet ink composition of this embodiment contains a composite resin fine particle composed of a first resin and a second resin and having an SP value of from 9.0 to 12.0 $(cal/cm^3)^{1/2}$, wherein the SP value of the second resin is greater than the SP value of the first resin, and the first resin has a greater mass than the second resin. A "water-based inkjet ink composition" means an ink composition intended primarily for use in inkjet recording systems, in the principal components of the composition include at least water as a solvent component.

When a nozzle fails to discharge due to bubbles or the like in the inkjet head, the ink composition accumulates in the pressure chamber, and dries under heat from a platen or the like. This causes the resin constituting the resin fine particles contained in the ink composition to dissolve in the inkjet head, depositing and clogging the head. Resin deposits on the nozzle plate can be removed by wiping for example, but clogging caused by resin deposits inside the inkjet head cannot always be resolved by wiping. Moreover, clogging caused by resin deposits inside the inkjet head can be resolved to a certain extent by suction cleaning, but cannot always be resolved by flushing. When suction cleaning is performed in such cases to resolve clogging caused by resin deposits inside the inkjet head, it may be necessary to interrupt printing for purposes of suction cleaning, which is disadvantageous from the standpoint of recording productivity.

In cases in which recording is performed without interrupting ink discharge from the nozzle and no resin deposits occur inside the inkjet head, if bubbles occur and the nozzle fails to discharge, drying of the ink may progress and resin deposits may occur in the nozzle. The ink is especially likely to dry when the nozzle is exposed to heat if the head is scanned on a heated platen. When a nozzle becomes clogged in this way, discharge stability is affected. Discharge stability that is affected by gradual dissolution of the ink when printing is performed continuously for a certain period of time is sometimes called continuous discharge stability.

By contrast, it was discovered that the ink composition of this embodiment is excellent in both continuous discharge stability of the ink and abrasion resistance of the image because it uses a specific composite resin fine particle as the resin for forming a coating on the recording medium. This composite resin fine particle is composed of a first resin and a second resin. Because the composite resin fine particle has an SP value of from 9.0 to 12.0 $(cal/cm^3)^{1/2}$, the SP value of the second resin is greater than the SP value of the first resin, and the mass of the first resin is greater than that of the second resin, the composite resin fine particle is unlikely to dissolve in the ink, so that no clogging occurs due to resin deposits inside the inkjet head, and the ink has good continuous discharge stability. Moreover, because the composite resin fine particle dissolves rapidly to form a coating on the recording medium, the image has good abrasion resistance. The constitution of the ink composition of this embodiment is explained in detail below.

1.1. Composite Resin Fine Particle

The ink composition of this embodiment contains a composite resin fine particle. This composite resin fine particle is composed of a first resin and a second resin. This composite resin fine particle has an SP value of from 9 to 12 $(cal/cm^3)^{1/2}$, the SP value of the second resin is greater than the SP value of the first resin, and the mass of the first resin is greater than that of the second resin.

The composite resin fine particle has a phase separation structure in which a phase (part) consisting of the first resin and a phase (part) consisting of the second resin are separate from one another.

The composite resin fine particle may assume a form in which the first and second resins constitute one part and another part, respectively, of the resin fine particle. For example, they may constitute the periphery and center of the resin fine particle, but other forms are also possible. For example, the composite resin fine particle may be constituted with the locations of the first and second resins in the composite resin fine particle complexly intertwined rather than forming a simple structure, or with the parts composed of the first resin and the parts composed of the second resin each being multiple and non-continuous. Moreover, the boundary between the first and second resin in the composite resin fine particle need not be clearly delineated, and the resin composition may transition continuously between the first resin and the second resin.

In one embodiment of the composite resin fine particle, either the first resin or the second resin principally constitutes an area near the edge (shell) of the composite resin fine particle, while the other principally constitutes an area near the center (core) of the particle, which is then called a composite resin fine particle with a core-shell structure, or a core-shell resin fine particle. In this case, the resin part constituting the edge of the core-shell resin fine particle is called the shell resin, while the resin part constituting the center is called the core resin. The core part may also be in a location apart from the center of the resin fine particle. A part composed of the core resin may also be partially exposed on the outermost surface of the resin fine particle. The core part may be either spherical or non-spherical. Of these, a core-shell resin fine particle in which the first resin constitutes the shell part and the second resin constitutes the core part is especially desirable for achieving superior continuous discharge stability, abrasion resistance and the like.

Another embodiment of the complex resin fine particle may be a complex resin fine particle with a sea-island structure in which a part consisting of either the first or the second resin forms a sea and parts consisting of the other resin are disposed as islands in the sea. In a composite resin fine particle with a sea-island structure, a part consisting of the other resin may be partially exposed on the outermost surface of the resin fine particle, and the islands may be disposed eccentrically rather than being distributed uniformly within the complex resin fine particle. The islands may also be either spherical or non-spherical, and may also be of different sizes. Of these, a composite resin fine particle with a sea-island structure comprising islands of the second resin in a sea of the first resin is particularly desirable for achieving superior continuous discharge stability, abrasion resistance and the like.

To achieve even greater continuous discharge stability, abrasion resistance and the like, the composite resin fine particle preferably has a core-shell structure or sea-island structure. A core-shell structure is one in which the core part appears as a single continuous part in an image of a single composite resin fine particle taken by a transmission electron microscope (TEM). A structure similar to a core-shell structure in which the core part appears as two or more non-continuous parts or in which more parts are observed is called a sea-island structure. If there is one core part it is called a core, while if the core part is separated into two or more or even more parts they are called islands. The particle is observed at a magnification of 50,000×.

A composite resin fine particle makes it easier to adjust the solubility of the resin fine particle because the properties of the first resin and second resin can be controlled independently. One property of a resin is its SP value for example. Other properties of the resin such as its glass transition temperature and degree of crosslinking may also be controlled. For example, if the shell or sea is constituted of the first resin and the first resin is one that dissolves with difficulty in the ink, the resin fine particle is less likely to dissolve in the ink during recording. If the core or islands are composed of the second resin, meanwhile, and the second resin is one that dissolves ready on the recording medium, the resin fine particle will dissolve easily on the recording medium. As a result, no clogging occurs due to resin deposits inside the inkjet head, and good continuous discharge stability of the ink is achieved together with excellent abrasion resistance of the recorded material.

1.1.1. First Resin

The first resin constituting a part of the composite resin fine particle may be a homopolymer or a copolymer.

The SP value (solubility parameter) of the first resin is preferably from 10.0 to 12.0 (cal/cm$^3$)$^{1/2}$, or more preferably from 10.3 to 11.0 (cal/cm$^3$)$^{1/2}$, or still more preferably from 10.5 to 10.9 (cal/cm$^3$)$^{1/2}$. The "SP value" of the resin in this embodiment is a solubility parameter (cal/cm$^3$)$^{1/2}$ calculated by the Fedors formula. The SP value calculated by the Fedors formula is a value showing the solubility behavior of a material, calculated using cohesive energy and molar molecular volume.

The SP values of each of the monomers used in synthesizing the resin are multiplied by the molar ratios of each monomer relative to the total moles of all the monomers, and the value obtained by weighted averaging of the SP values is taken as the SP value of the resin.

If the SP value of the first resin is within the aforementioned range, the composite resin fine particle is unlikely to dissolve in the ink, no clogging occurs due to resin deposits inside the inkjet head, and the continuous discharge stability of the ink tends to be good. It is also easier to control foreign matter and achieve excellent abrasion resistance and OD value.

The SP value of the first resin can be kept within this range for example by using a monomer component with an SP value within this range for constituting the resin, and when multiple kinds of monomers are used, the multiple monomers can be selected and their mass ratios determined so as to keep the SP value of the resin within this range.

The lower limit of the glass transition temperature (hereunder sometimes called the "Tg") of the first resin is preferably at least 60° C., or more preferably at least 63° C., or still more preferably at least 67° C., or yet more preferably at least 73° C., or most preferably at least 77° C. The upper limit is preferably not more than 100° C., or more preferably not more than 95° C., or still more preferably not more than 87° C., or yet more preferably not more than 83° C. If the Tg of the first resin is not more than 95° C., the abrasion resistance of the image is good because the first resin is dissolved by heat treatment or the like on the recording medium to form a coating. If the Tg of the first resin is at least 60° C., on the other hand, melting of the first resin in the ink can be suppressed even when the head is scanned on a heated platen, resulting in good continuous discharge stability of the ink.

When the first resin is a homopolymer, the Tg of the first resin may be as described in the literature (such as the Polymer Handbook, etc.). When the first resin is a copolymer, on the other hand, the Tg of the first resin can be calculated by the FOX formula below from the Tg$_n$ values (unit: K) of the various individual polymers and the mass ratios (W$_n$) of the monomers.

$$\frac{1}{Tg} = \frac{W_1}{Tg_1} + \frac{W_2}{Tg_2} + \ldots + \frac{W_n}{Tg_n}$$

Herein, W$_n$ is the mass ratio of each monomer, Tg$_n$ is the Tg (unit: K) of a homopolymer of each monomer, and Tg is the Tg (unit: K) of the copolymer.

The Tg of the resin can be kept within this range by using monomers with Tg values within this range to prepare the resin, or by selecting monomers for preparing the resin so that the Tg of the resin is within the range according to the formula, or by adjusting the mass ratios.

The first resin is not particularly limited, but an acrylic resin may be used. An acrylic resin is a resin having (meth)acrylic monomer units, and is desirable from the standpoint of availability and easy control of the various physical property values. The content of (meth)acrylic monomer units is preferably at least 30 mass %, or more preferably at least 50 mass %, or still more preferably at least 70 mass %. The content of (meth)acrylic monomer units may be 100 mass %, but is preferably not more than 90 mass % from the standpoint of obtaining the physical properties. The acrylic resin may be a resin having (meth)acrylic monomer units and other monomer units other than (meth)acrylic monomer units, and this is desirable because it makes it easier to adjust the various physical property values. Examples of other monomer units include vinyl monomer units. It is also desirable for the acrylic resin to have aromatic monomer units. Examples of aromatic monomer units include aromatic vinyl monomer units and aromatic (meth)acrylic monomer units, and a resin having aromatic vinyl monomer units is preferred. Given 100 mass % as the total constituent units of the first resin in this case, the lower limit of the constituent ratio of the aromatic monomer units is preferably at least 5 mass %, or more preferably at least 10 mass %, or especially at least 15 mass %. The upper limit of the content of aromatic monomer units is preferably not more than 100 mass %, or more preferably not more than 95 mass %, or especially not more than 90 mass %. If the content ratio of aromatic monomer units in the first resin is within this range, adhesive force is generated when the first resin is dissolved, resulting in good adhesiveness between the recording medium and the resin coating, which tends to give the image good abrasion resistance.

The (meth)acrylic monomer units are not particularly limited, but for purposes of increasing the glass transition temperature or obtaining a crosslinked resin as discussed below, at least some bifunctional or higher (meth)acrylic monomer units can be included as crosslinkable components.

Examples of bifunctional or higher (meth)acrylic monomer units include polyethylene glycol di(meth)acrylate, polypropylene glycol di(meth)acrylate, polytetramethylene glycol di(meth)acrylate, 2-hydroxy-3-(meth)acryloyloxypropyl (meth)acrylate, 1,6-hexanediol di(meth)acrylate, 1,9-nonanediol di(meth)acrylate, 1,10-decanediol di(meth)acrylate, dipropylene glycol di(meth)acrylate, tripropylene glycol di(meth)acrylate, tricyclodecanedimethanol di(meth)acrylate, 9,9-bis[4-(2-(meth)acryloyloxyethoxy)phenyl]fluorene, ethoxylated bisphenol A di(meth)acrylate, propoxylated bisphenol A di(meth)acrylate, propoxylated ethoxylated bisphenol A di(meth)acrylate, pentaerythritol tri(meth)acrylate, trimethylolpropane tri(meth)acrylate, ditrimethylolpropane tetra(meth)acrylate, pentaerythritol (meth)acrylate, dipentaerythritol hexa(meth)acrylate, ethoxylated isocyanuric acid tri(meth)acrylate and ethoxylated pentaerythritol tetra(meth)acrylate.

The first resin may contain a monofunctional (meth)acrylic monomer unit as a (meth)acrylic monomer unit. Examples of the monofunctional (meth)acrylic monomer unit include hydrophilic (meth)acrylate monomer units, hydrophobic (meth)acrylate monomer units having alkyl groups with 3 or more carbon atoms, hydrophobic (meth)acrylate monomer units having cyclic structures, and (meth)acrylamide monomer units and N-substituted derivatives thereof and the like.

The hydrophilic (meth)acrylate monomer units are not particularly limited, but examples include methyl (meth)acrylate, ethyl (meth)acrylate, α-hydroxymethyl (meth)acrylate, 2-hydroxyethyl (meth)acrylate, (poly)ethylene glycol (meth)acrylate, methoxy (poly)ethylene glycol (meth)acrylate, ethoxy (poly)ethylene glycol (meth)acrylate and (poly)propylene glycol (meth)acrylate. Of these, methyl (meth)acrylate and ethyl (meth)acrylate are preferred. "Hydrophilic" here means that solubility in 100 mL of water at 20° C. is at least 0.3 g.

The hydrophobic (meth)acrylate monomer units having alkyl groups with 3 or more carbon atoms are not particularly limited, but examples include n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth)acrylate, lauryl (meth)acrylate, stearyl (meth)acrylate, cetyl (meth)acrylate, neopentyl (meth)acrylate, behenyl (meth)acrylate and other (meth)acrylates having alkyl groups with 3 or more carbon atoms. Of these, lauryl (meth)acrylate is preferred. "Hydrophobic" here means that solubility in 100 mL of water at 20° C. is less than 0.3 g.

The (meth)acrylate monomer units having cyclic structures are not particularly limited, but examples include cyclohexyl (meth)acrylate, dicyclopentanyl (meth)acrylate, dicyclopentenyl (meth)acrylate, dicyclopentenyloxyethyl (meth)acrylate, isobornyl (meth)acrylate, norbornyl (meth)acrylate, adamantyl (meth)acrylate and tetrahydrofurfuryl (meth)acrylate.

The (meth)acrylamide monomer units or N-substituted derivatives thereof are not particularly limited, but examples include (meth)acrylamide, N-hydroxymethyl (meth)acrylamide, diacetone acrylamide, N,N-dimethyl (meth)acrylamide and other (meth)acrylamides and N-substituted derivatives thereof.

Examples of aromatic monomer units include styrene, α-methylstyrene, p-methylstyrene, vinyl toluene, chlorostyrene, divinyl benzene and the like.

The first resin may also have a monomer unit other than the aforementioned monomer units, such as a carboxylic acid monomer unit or the like for example. The relative acid number of the composite resin fine particle can be controlled if the first resin has a carboxylic acid monomer unit.

The carboxylic acid monomer unit is not particularly limited, but examples include (meth)acrylic acid, crotonic acid, maleic acid, fumaric acid, itaconic acid and the like. Of these, (meth)acrylic acid is preferred. A "carboxylic acid monomer unit" here means a polymerizable monomer unit having a carboxyl group and a polymerizable unsaturated group.

One of these monomers alone or a combination of two or more kinds may be used.

A polyurethane resin, polyolefin resin, polyester resin, polyether resin or the like may be used as the first resin instead of an acrylic resin. The polyurethane resin, polyolefin resin, polyester resin and polyether resin may each be any resin having a polyurethane structure, polyolefin structure, polyester structure and polyether structure, respectively, in the main backbone of the polymer.

The first resin may also be crosslinked. When the resin is crosslinked, it may contain the aforementioned bifunctional or higher (meth)acrylic monomer unit for example as a crosslinkable component, or a bifunctional or higher monomer unit having a polymerizable functional group other than a (meth)acrylic group, or it may be crosslinked using a crosslinking agent or the like that imparts a crosslinked structure to the resin.

The crosslinking rate of the first resin is preferably not more than 2%, or more preferably not more than 1.5%, or still more preferably not more than 1.0%, or especially not more than 0.5%. The lower limit of the crosslinking rate is 0%, meaning that the resin does not have to be crosslinked. If the crosslinking rate of the first resin is within this range, the composite resin fine particle dissolves easily on the recording medium, resulting in excellent abrasion resistance and a superior OD value. The composite resin fine particle also dissolves less easily in the ink, so that no clogging occurs due to resin deposits inside the inkjet head, resulting in good continuous discharge stability of the ink. Dispersion stability is also excellent.

The crosslinking rate here is the added percentage of the crosslinking agent relative to the total constituent units of the first resin, and can be determined according to the following formula:

Crosslinking rate (mol %)=((crosslinking agent: mol)/(total constituent units of first resin: mol))×100

1.1.2. Second Resin

As long as it has a higher SP value than the first resin, the second resin constituting part of the composite resin fine particle may be constituted similarly to the first resin described above, and independently of the first resin.

The second resin is not particularly limited, but is preferably a resin with a low percentage content of crosslinkable components, and more preferably it is a non-crosslinked resin containing no crosslinkable components. If the second resin is a resin other than a crosslinked resin, it dissolves rapidly to form a coating on the recording medium, resulting in good adhesiveness on the recording medium and good abrasion resistance of the image. The second resin may be either a homopolymer or a copolymer. For the reasons described above, the content of crosslinkable components in the second resin is preferably lower than in the first resin.

The lower limit of the Tg of the second resin is preferably at least 10° C., or more preferably at least 60° C., or still more preferably at least 63° C., or yet more preferably at least 67° C., or especially at least 73° C. The upper limit is preferably not more than 95° C., or more preferably not more than 87° C., or yet more preferably not more than 83° C. If the Tg of the second resin is not more than 95° C., the image has good abrasion resistance because the second resin dissolves and forms a coating on the recording medium when heat treated or the like. When the Tg of the second resin is at least 10° C., moreover, the ink has good continuous discharge stability because melting of the second resin in the ink is suppressed even when the head is scanned on a heated platen.

The Tg of the second resin can be determined in the same way as that of the first resin.

The second resin is not particularly limited, but like the first resin, it is preferably an acrylic resin having (meth) acrylic monomer units. The second resin is also preferably a non-crosslinked resin as discussed above, and is preferably a resin having a monofunctional (meth)acrylic monomer unit.

The monofunctional (meth)acrylic monomer unit is not particularly limited, and examples include hydrophilic (meth)acrylate monomer units, hydrophobic (meth)acrylate monomer units having alkyl groups with 3 or more carbon atoms, hydrophobic (meth)acrylate monomer units having cyclic structures, and (meth)acrylamide monomer units and N-substituted derivatives thereof and the like. Specific examples of these monofunctional (meth)acrylic monomer units are similar to those given as examples above.

Like the first resin, the second resin may also have a monomer unit other than those described above, such as a carboxylic acid monomer unit or the like for example. The relative acid number of the composite resin fine particle can be controlled if the second resin has a carboxylic acid monomer unit. Specific examples of the carboxylic acid monomer unit are similar to those given as examples above.

One of these monomers alone or a combination of two or more kinds may be used.

The SP value of the second resin is preferably from 10.5 to 12.0 $(cal/cm^3)^{1/2}$, or more preferably from 10.7 to 11.7 $(cal/cm^3)^{1/2}$, or still more preferably from 11.0 to 11.5 $(cal/cm^3)^{1/2}$, or especially from 11.1 to 11.5 $(cal/cm^3)^{1/2}$. If the SP value of the second resin is within this range, the composite resin fine particle dissolves easily and therefore dissolves rapidly to form a coating on the recording medium. This results in good abrasion resistance of the image. The SP value is defined as before. The SP value of the second resin can be kept within this range by for example using a monomer component with an SP value within this range for constituting the resin, or when multiple kinds of monomers are used, the multiple monomers can be selected and their mass ratios determined so as to keep the SP value of the resin within this range.

1.1.3. Physical Properties of Composite Resin Fine Particle

The composite resin fine particle has an SP value of from 9.0 to 12.0 $(cal/cm^3)^{1/2}$. The SP value of the composite resin fine particle is the SP value of the resin constituting the composite resin fine particle as a whole. In this embodiment, the SP value of the resin is a value calculated by the Fedors formula.

The SP value of the composite resin fine particle can be determined from all the resins constituting the composite resin fine particle, or by weighted averaging based on the SP values of the first and second resins and the molar ratios of the first and second resins in the composite resin fine particle.

The SP value of the composite resin fine particle is preferably from 9.5 to 11.7 $(cal/cm^3)^{1/2}$, or more preferably from 10.0 to 11.5 $(cal/cm^3)^{1/2}$, or still more preferably from 10.5 to 11.2 $(cal/cm^3)^{1/2}$. An SP value within this range is desirable for achieving even greater continuous discharge stability and abrasion resistance, and also from the standpoint of the OD value and controlling foreign matter.

The SP value of the second resin is higher than that of the first resin, and is preferably at least 0.1 $(cal/cm^3)^{1/2}$ higher, or more preferably from 0.1 to 1.0 $(cal/cm^3)^{1/2}$ higher, or still more preferably from 0.2 to 0.7 $(cal/cm^3)^{1/2}$ higher, or yet more preferably from 0.3 to 0.5 $(cal/cm^3)^{1/2}$ higher. A difference in SP values within this range is desirable for achieving even greater continuous discharge stability and abrasion resistance, and also from the standpoint of the OD value and controlling foreign matter.

The average particle diameter (nm) of the composite resin fine particle is preferably from 100 to 300 nm, or more preferably from 150 to 250 nm, or still more preferably from 160 to 240 nm, or especially from 170 to 230 nm. If the average particle diameter of the composite resin fine particle is within this range, the resin has an excellent balance of solubility. That is, because the composite resin fine particle resists dissolution and remains as is in the ink, the ink has even better continuous discharge stability. Once the ink has been discharged onto the recording medium, moreover, the composite resin fine particle dissolves easily and rapidly forms a coating, giving the image good abrasion resistance. If the average particle diameter of the composite resin fine particle does not exceed the aforementioned range, there will be no problems of reduced OD value or poor glossiness of the image due to increased light scattering caused by the composite resin fine particle. The average particle diameter of the composite resin fine particle is the volume-based average particle diameter as measured using a particle size distribution measurement device based on the measurement principle of dynamic light scattering. In the examples below, a particular kind of dynamic light scattering called laser diffraction/scattering (Microtrac method) was used.

In the mass ratio of the second resin and the first resin in the composite resin fine particle, the first resin has a greater mass than the first resin. The mass ratio of the second resin and the first resin in the composite resin fine particle (mass of second resin/mass of first resin) is preferably from 1/20 to 1/2, or more preferably from 1/15 to 1/2.5, or still more preferably from 1/11 to 1/3, or especially from 1/7 to 1/3. If the mass ratio of the second resin to the first resin is within this range, both the continuous discharge stability of the ink and the abrasion resistance of the image tend to be better, and the continuous discharge stability of the ink tends to be better in particular.

The acid value of the composite resin fine particle is preferably from 5 to 35 mgKOH/g, or more preferably from 7 to 20 mgKOH/g, or especially from 10 to 15 mgKOH/g. If the relative acid value of the composite resin fine particle is within this range, both the continuous discharge stability of the ink and the abrasion resistance of the image tend to be better.

The acid value is a parameter indicating hydrophilicity/hydrophobicity, and higher values indicate greater hydrophilicity, while smaller numbers indicate greater hydrophobicity. Consequently, if the acid value of the composite resin fine particle is below this range, the composite resin fine particle is more compatible with the solvent, and is more likely to dissolve in the ink, causing clogging due to resin deposition in the inkjet head, and discharge failure in some cases. If the acid value of the composite resin fine particle exceeds this range, on the other hand, the composite resin fine particle becomes more compatible with water, and a uniform coating may not form because water tends to remain rather than being repelled from the recording medium, resulting in poor abrasion resistance.

The acid value of the composite resin fine particle can be calculated from the molecular weights and contents of the monomer units in the first resin constituting the composite resin fine particle and the number of anionic groups contained in the monomer units. Specifically, it is calculated by the following formulae from the constitution of the first resin constituting the composite resin fine particle.

(mass parts of monomer 1 having anionic groups out of monomers constituting first resin/total mass parts of all monomers constituting first resin)/molecular weight of monomer 1×number of anionic groups in molecule of monomer 1=$A1$ (Formula 1)

$A1 \times 56.11 \times 1000$=acid value of composite resin fine particle (mgKOH/g) (Formula 2)

The anionic groups are carboxyl groups. When more than one of the monomers constituting the first resin has anionic groups, A2, A3, etc. are calculated for each monomer as in Formula 1, and the total value of A1+A2+A3+ . . . is used in the same way as A1 in Formula 2 to calculate the acid value.

If the first resin has a greater mass than the second resin relative to the mass of the composite resin fine particle as a whole, the acid value of the composite resin fine particle is determined from the first resin on the assumption that the properties attributable to the outermost surface of the composite resin fine particle are attributable to the resin constituting the outermost surface of the composite resin fine particle.

The content (as solids) of the composite resin fine particle is preferably from 0.5 to 20 mass %, or more preferably from 0.6 to 15 mass %, or especially from 0.7 to 10 mass % of the total mass (100 mass %) of the ink composition. If the content of the composite resin fine particle is at least 0.5 mass %, abrasion resistance and adhesiveness tend to be excellent. If the content of the composite resin fine particle is not more than 20 mass %, on the other hand, continuous discharge stability tends to be excellent.

1.1.4. Method for Synthesizing Composite Resin Fine Particle

The method for synthesizing the composite resin fine particle is not particularly limited, and for example it can be synthesized by a known emulsion polymerization method or an appropriate combination of such methods. Specific examples include batch mixing polymerization methods, monomer drop methods, pre-emulsion methods, seed emulsion polymerization methods, multistage emulsion polymerization methods (two-stage emulsion polymerization, etc.), phase inversion emulsion polymerization methods and the like. Synthesis methods are explained in detail below using the example of a core-shell resin fine particle or sea-island resin fine particle having a core or islands composed of a second resin in a shell or sea composed of the first resin as an example of the composite resin fine particle.

1.1.4.1. Synthesis Method 1

First, a particle of the second resin is synthesized by an ordinary emulsion polymerization method using a water-based medium. The emulsion polymerization method may conform to known methods, but for example given 100 parts as the total amount of monomers used, polymerization may be performed using normally from 100 to 500 parts of water (water-based medium). The polymerization temperature is preferably from −10° C. to 100° C., or more preferably from −5° C. to 100° C., or still more preferably from 0° C. to 90° C. The polymerization time is preferably from 0.1 to 30 hours, or more preferably from 2 to 25 hours. A batch method in which the monomers are loaded all at once, a method in which the monomers are supplied in separate batches or continuously, a method in which a monomer pre-emulsion is supplied in separate batches or continuously, or a method in comprising a combination of these methods in stages may be adopted as the method of emulsion polymerization. One or two or more polymerization initiators, molecular weight adjusters, emulsifiers or the like commonly used in emulsion polymerization may also be used as necessary.

The polymerization initiator is not particularly limited, but examples include persulfates such as potassium persulfate and ammonium persulfate; organic peroxides such as diisopropyl peroxydicarbonate, benzoyl peroxide, lauroyl peroxide and tert-butylperoxy-2-ethylhexanoate; azo compounds such as azobisisobutyronitrile, dimethyl-2,2'-azobisisobutyrate and 2-carbamoylazaisobutyronitrile; and redox systems combining radical emulsifiers containing radical emulsifying compounds having peroxide groups with sodium bisulfite and reducing agents such as ferrous sulfate. One polymerization initiator alone or a combination of two or more may be used.

The molecular weight adjuster is not particularly limited, but examples include mercaptans such as n-hexyl mercaptan, n-octyl mercaptan, n-dodecyl mercaptan, t-dodecyl mercaptan, n-hexadecyl mercaptae, n-tetradecyl mercaptan, t-tetradecyl mercaptan and thioglycolic acid; xanthogen disulfides such as dimethylxanthogen disulfide, diethylxanthogen disulfide and diisopropylxanthogen disulfide; thiuram disulfides such as tetramethylthiuram disulfide, tetraethylthiuram disulfide and tetrabutylthiuram disulfide; halogenated hydrocarbons such as chloroform, carbon tetrachloride, carbon tetrabromide and ethylene bromide; hydrocarbons such as pentaphenyl ethane and α-methylsytrene dimer; and acrolein, methacrolein, allyl alcohol, 2-ethylhexyl thioglycol, terpinolene, α-terpinene, γ-terpinene, dipentene and 1,1-diphenylethylene. One kind of molecular weight adjuster alone or a combination of two or more may be used.

The emulsifier is not particularly limited, but examples include anionic surfactants such as alkyl sulfate ester salts and alkyl benzene sulfonate salts; nonionic surfactants such as alkyl esters of polyethylene glycol, alkyl ethers of polyethylene glycol and alkyl phenyl ethers of polyethylene glycol; reactive emulsifiers containing hydrophilic and hydrophobic groups and radical reactive groups; and polymeric emulsifiers comprising hydrophilic groups introduced into polymers such as vinyl polymers and polyester polymers and the like. One kind of emulsifier alone or a combination of two or more may be used. A hydrophilic group is a molecular group with a strong affinity for water, and examples include nitro, hydroxyl, amino, carboxyl and sulfonic acid groups and the like. A hydrophobic group is a molecular group having lower affinity for water than a hydrophilic group, and examples include linear or branched alkyl groups, alicyclic groups, aromatic groups, alkylsilyl groups, perfluoroalkyl groups and the like.

Next, the monomers for the first resin are polymerized in the presence of the resulting particle of the second resin. Specifically, a core-shell resin fine particle or sea-island resin fine particle can be formed by seed polymerizing the monomers for the first resin using the resulting particle of the second resin as a seed particle. For example, the monomers for the first resin or a pre-emulsion thereof can be dropped in one batch, in separate batches or continuously together with a crosslinking agent as necessary into an aqueous medium having the particle of the second resin dispersed therein. The amount of the particle of the second resin used in this case is preferably from 5 to 50 mass parts per 100 mass parts of the monomers of the first resin. The first resin can also be crosslinked if a crosslinking agent is used during polymerization.

When using a crosslinking agent, the crosslinking agent is not particularly limited, and examples include phenolic resins, amino resins and the like. Examples of phenolic resins include resol-type phenolic resins with introduced methylol groups obtained by condensation reactions between phenols such as phenol and bisphenol A and aldehydes such as formaldehyde in the presence of a reaction catalyst. Examples of aldehydes include formaldehyde, paraformaldehyde, acetaldehyde, benzaldehyde and the like. At least some of the methylol groups in this resin may also be etherified with a $C_{1-8}$ alcohol such as methyl alcohol, ethyl alcohol, n-butyl alcohol or isobutyl alcohol. Examples of amino resins include methylolated amino resins obtained by reacting an amino component such as melamine, urea, benzoguanamine, spiroguanamine or dicyandiamine with an aldehyde. Examples of aldehydes include formaldehyde, paraformaldehyde, acetaldehyde, benzaldehyde and the like. At least some of the methylol groups in this resin may also be etherified with a $C_{1-8}$ alcohol such as methyl alcohol, ethyl alcohol, n-butyl alcohol or isobutyl alcohol.

When a polymerization initiator, molecular weight adjuster, emulsifier or the like is used during polymerization, these may be similar to those used when manufacturing the particle of the second resin. Other conditions such as polymerization time may also be similar to those used when manufacturing the particle of the second resin.

1.1.4.2. Synthesis Method 2

Next, a polymerization method in which the first resin part is synthesized first is explained. First, the first resin part is synthesized. Specifically, a pre-emulsion solution containing the aforementioned hydrophilic monomer is prepared using a reactive emulsifier, and this pre-emulsion is added dropwise to a water-based medium together with a polymerization initiator and a crosslinking agent to thereby perform a polymerization reaction and synthesize the first resin part.

Next, using the resulting first resin part as the polymerization site, the second resin part is polymerized to synthesize the core-shell resin fine particle or sea-island resin fine particle of this embodiment. Specifically, a monomer mixture containing the aforementioned hydrophobic monomer is added dropwise to a water-based dispersion medium containing the first resin part, and the second resin part is polymerized to obtain the core-shell resin fine particle or sea-island resin fine particle. When the first resin part is the polymerization site, the mixture may be added as monomer oil droplets because there is no need to include an emulsifier in the monomer mixture.

With such multistage emulsion polymerization, the content of the emulsifier in the ink composition can be easily kept at not more than 0.01 mass % because the first resin part is synthesized using a reactive emulsifier and the second resin part can be synthesized without any emulsifier. When the content of the emulsifier in the ink composition is not more than 0.01 mass %, aggregation of ink components is suppressed at the ink interfaces (the air-liquid interface between the air and the ink and the solid-liquid interface between the ink and a material contacting the ink, such as the ink container), which is desirable for achieving superior storage stability. Moreover, when the content of the emulsifier in the ink composition is not more than 0.01 mass %, an ink container having an ink fillable inlet can be used by preference because the foaming and defoaming properties are excellent. An "ink container having an ink fillable inlet" is an ink container that has a removable or openable inlet that allows the user to easily inject the ink composition, but is liable to foaming during injection. An inlet with an opening area of at least 20 mm$^2$ is desirable because the ink composition can then be filled easily. Such ink containers are disclosed for example in JP-A-2005-219483 and JP-A-2012-51309.

Even when a core-shell resin fine particle or sea-island resin fine particle is synthesized using a large amount of emulsifier, moreover, the content of the emulsifier in the ink composition can still be kept at or below 0.01 mass % by removing excess emulsifier after the core-shell resin fine particle has been synthesized.

Finally, a core-shell resin fine particle dispersion is obtained by neutralizing and adjusting the pH with a base such as sodium hydroxide, potassium hydroxide or ammonia, and filtering as necessary. In the synthesis method, the monomer concentration, polymerization temperature, stirring speed, polymerization time and the like can be adjusted to obtain either a core-shell resin fine particle or sea-island resin fine particle. It is particularly desirable to adjust these polymerization conditions when synthesizing the second resin.

Methods for manufacturing such sea-island resin fine particles and core-shell resin fine particles are described for example in Colloids and Surfaces A: Physiochemical and Engineering Aspects 153 (1999), 255-270.

1.2. Water

The ink composition of this embodiment contains water. The water is not particularly limited, and pure water or ultrapure water such as ion-exchange water, ultrafiltered water, reverse osmosis water or distilled water may be used. By including water, it is possible to minimize organic solvents and thereby obtain an environmentally-friendly ink composition.

The water content is preferably from 40 to 95 mass %, or more preferably from 45 to 90 mass %, or still more preferably from 50 to 80 mass %, or yet more preferably from 55 to 75 mass %, or especially from 60 to 70 mass % relative to the total mass (100 mass %) of the ink composition.

1.3. Other Additives 1.3.1. Coloring Material

The ink composition of this embodiment preferably contains a coloring material. The coloring material is not particularly limited, and examples include pigments and dyes.

1.3.1.1. Pigment

Of the coloring materials, pigments are not only insoluble or hardly soluble in water, but also have the property of resisting fading caused by light, gas and the like. Consequently, recorded material recorded with an ink that uses a pigment has good water resistance, gas resistance and light resistance, and good storage stability. Any inorganic pigment or organic pigment may be used. Of these, either or both of an organic pigment and a carbon black that is classified as an inorganic pigment is desirable because these have good color development, and are unlikely to precipitate during dispersion because they have small specific gravities.

The inorganic pigment is not particularly limited, but examples include carbon black, iron oxide and titanium oxide.

The carbon black is not particularly limited, but examples include furnace black, lamp black, acetylene black and channel black (C.I. Pigment Black 7). Examples of commercial carbon blacks include No. 2300, 900, MCF88, No. 20B, No. 33, No. 40, No. 45, No. 52, MA7, MA8, MA100 and No. 2200B (all product names of Mitsubishi Chemical Corporation), Color Black FW1, FW2, FW2V, FW18, FW200, S150, S160 and S170, Printex 35, U, V and 140U, and Special Black 6, 5, 4A, 4 and 250 (all product names of Degussa AG), Conductex SC and Raven 1255, 5750, 5250, 5000, 3500, 1255 and 700 (all product names of Columbian Carbon Japan Ltd.), Columbian Chemicals products, and Regal 400R, 330R and 660R, Mogul L, Monarch 700, 800, 880, 900, 1000, 1100, 1300 and 1400 and Elftex 12 (all product names of Cabot Corporation).

The organic pigment is not particularly limited, and examples include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments and azo pigments. Specific examples of organic pigments include the following.

Examples of pigments used in cyan inks include C.I. Pigment Blue 1, 2, 3, 15, 15:1, 15:2, 15:3, 15:4, 15:6, 15:34, 16, 18, 22, 60, 65 and 66, and C.I. Vat Blue 4 and 60.

Examples of pigments used in magenta inks include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254 and 264, and C.I. Pigment Violet 19, 23, 32, 33, 36, 38, 43 and 50.

Examples of pigments used in yellow inks include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185 and 213.

Examples of pigments used in color inks other than cyan magenta and yellow are not particularly limited, but include C.I. Pigment Green 7 and 10, C.I. Pigment Brown 3, 5, 25 and 26, and C.I. Pigment Orange 1, 2, 5, 7, 13, 14, 15, 16, 24, 34, 36, 38, 40, 43 and 63.

Examples of pigments used in white inks include C.I. Pigment White 6, 18 and 21, and white inorganic pigments such as titanium oxide, zinc oxide, zinc sulfide, antimony oxide, magnesium oxide and zirconium oxide. Apart from these white inorganic pigments, white organic pigments such as hollow resin particles and polymer particles may also be used.

Apart from these pigments, pearl pigments and metallic pigments may also be used. Examples of pearl pigments include titanium dioxide coated mica, fish scale, bismuth oxychloride and other pigments having pearl luster and interference gloss. Examples of metallic pigments include particles of aluminum, silver, gold, platinum, nickel, chrome, tin, zinc, indium, titanium and copper or alloys of these.

One kind of pigment alone or a combination of two or more may be used.

1.3.1.2. Dye

Of the coloring materials, examples of dyes are not particularly limited but include acidic dyes, direct dyes, reactive dyes and basic dyes. Specific examples of dyes include C.I. Acid Yellow 17, 23, 42, 44, 79 and 142, C.I. Acid Red 52, 80, 82, 249, 254 and 289, C.I. Acid Blue 9, 45 and 249, C.I. Acid Black 1, 2, 24 and 94, C.I. Food Black 1 and 2, C.I. Direct Yellow 1, 12, 24, 33, 50, 55, 58, 86, 132, 142, 144 and 173, C.I. Direct Red 1, 4, 9, 80, 81, 225 and 227, C.I. Direct Blue 1, 2, 15, 71, 86, 87, 98, 165, 199 and 202, C.I. Direct Black 19, 38, 51, 71, 154, 168, 171 and 195, C.I. Reactive Red 14, 32, 55, 79 and 249, and C.I. Reactive Black 3, 4 and 35. One kind of dye alone or a combination of two or more may be used.

The content of the coloring material is preferably from 0.5 to 15 mass %, or more preferably 1 to 10 mass %, or most preferably from 1 to 5 mass % relative to the total mass (100 mass %) of the ink composition.

1.3.2. Organic Solvent

The ink composition of this embodiment may contain an organic solvent. The organic solvent is not particularly limited, but examples include resin-dissolving solvents, penetrating solvents and humectant solvents. One kind of organic solvent alone or a combination of two or more may be used.

The resin-dissolving solvent is not particularly limited, but examples include aprotic polar solvents such as dimethylsulfoxide (DMSO), dimethylformamide (DMF), hexamethylphosphoramide (HMPA), cyclic amides and dioxane. A cyclic amide is preferred, N-methyl-2-pyrrolidone, N-ethyl-2-pyrrolidone, N-vinyl-2-pyrrolidone, 2-pyrrolidone, N-butyl-2-pyrrolidone or 5-methyl-2-pyrrolidone is more preferred, and 2-pyrrolidone is especially desirable. One kind of resin-dissolving solvent alone or a combination of two or more kinds may be used. When such a resin-dissolving solvent is used, deposition of the composite resin fine particle inside the head or cavity is suppressed, while adhesiveness and wear resistance tend to be better on low-absorbent and non-absorbent recording media.

When the ink composition contains a cyclic amide in particular, the stability of the composite resin fine particle is further improved, and storage stability and particularly storage stability at high temperatures tends to be excellent because precipitation of foreign matter in the ink composition is effectively suppressed. Because cyclic amides have humectant properties, moreover, aggregation and solidification of the composite resin fine particle and other components due to evaporation of moisture from the ink composition during storage can be suppressed. This helps to prevent clogging near the nozzle of the head during inkjet recording, and tends to further improve the discharge stability of the ink composition.

The content of the resin-dissolving solvent is preferably from 3 to 25 mass %, or more preferably from 5 to 20 mass %, or especially from 7 to 17 mass % relative to the total mass (100 mass %) of the ink composition. If the content of the resin-dissolving solvent is within this range, the dispersion stability of the coloring material and composite resin fine particle in the ink and the continuous discharge stability of the ink tend to be further improved.

The penetrating solvent is not particularly limited, but examples include alkanediols preferably having 4 or more carbon atoms, such as butanediol, pentanediol, hexanediol and octanediol; and glycol ethers such as alkylene glycol monoether and alkylene glycol diether. One kind of penetrating solvent alone or a combination of 2 or more may be used. Using such a penetrating solvent, the embedding property (wet spreadability) and permeability of the ink on the recording medium tend to be further improved.

The content of the penetrating solvent is preferably from 1 to 20 mass %, or more preferably from 5 to 15 mass %, or especially from 6 to 12 mass % relative to the total mass (100 mass %) of the ink composition. If the content of the penetrating solvent is within this range, the embedding property (wet spreadability) and permeability of the ink on the recording medium tend to be further improved.

The humectant solvent is not particularly limited, but examples include polyol compounds (with 3 or more hydroxyl groups) such as glycerin; and alkane diols with preferably 3 or less carbon atoms or alkane diols with polyether backbones comprising alkylene glycols with 3 or less carbon atoms, such as ethylene glycol, diethylene glycol, triethylene glycol, polyethylene glycol, propylene glycol, dipropylene glycol, tripropylene glycol, polypropylene glycol and propanediol. One kind of humectant solvent alone or a combination of two or more may be used. Using such a humectant solvent, drying of the ink in the inkjet head is further suppressed, and continuous discharge stability tends to be further improved as a result.

The content of the humectant solvent is preferably from 0 to 12 mass %, or more preferably from 2.5 to 10 mass %, or still more preferably from 5 to 7.5 mass % relative to the total mass (100 mass %) of the ink composition. If the content of the humectant solvent is within this range, drying of the ink in the inkjet head is further suppressed, and continuous discharge stability tends to be further improved as a result.

When the ink composition of this embodiment contains an organic solvent, the content of an organic solvent with a standard boiling point above 280° C. is preferably not more than 5 mass %, or more preferably not more than 3 mass %, or still more preferably not more than 1 mass %, or especially not more than 0.5 mass % relative to the total mass (100 mass %) of the ink composition. The lower limit of the content of the organic solvent with a standard boiling point above 280° C. is 0 mass %. If the content of the organic solvent with a standard boiling point above 280° C. is within this range, the invention is especially useful because the drying properties are more suited to recording on non-absorbent or low-absorbent recording media.

When the ink composition of this embodiment contains an organic solvent, meanwhile, it preferably contains an organic solvent with a standard boiling point of 150° C. to 260° C. The content of the organic solvent with a standard boiling point of 150° C. to 260° C. is preferably from 5 to 30 mass %, or more preferably from 10 to 30 mass %, or especially from 15 to 30 mass % relative to the total mass (100 mass %) of the ink composition. If the content of the organic solvent with a standard boiling point of 150° C. to 260° C. is within this range, the dispersion stability of the coloring material and composite resin fine particle in the ink, the continuous discharge stability, the embedding property (wet spreadability) and permeability of the ink on the recording medium and the drying resistance of the ink tend to be further improved.

The content of the organic solvent is preferably from 15 to 40 mass %, or more preferably from 20 to 35 mass %, or especially from 25 to 30 mass % relative to the total mass (100 mass %) of the ink composition. If the content of the organic solvent is within this range, the dispersion stability of the coloring material and composite resin fine particle in the ink, the continuous discharge stability, the embedding property (wet spreadability) and permeability of the ink on the recording medium, the abrasion resistance and the drying resistance of the ink tend to be further improved.

The organic solvent preferably includes an organic solvent with an SP value equal to or greater than the SP value of the second resin, and more preferably includes an organic solvent with an SP value higher than that of the second resin. The organic solvent also preferably includes an organic solvent with an SP value of at least 11, and more preferably includes an organic solvent with an SP value of 11.5 to 20.0.

1.3.3. Surfactant

The ink composition of this embodiment may contain a surfactant. The surfactant is not particularly limited, but examples include acetylene glycol surfactants, fluorine surfactants and silicone surfactants. Of these, it is desirable to include at least either an acetylene glycol surfactant or a silicone surfactant. When such a surfactant is included, the dissolution time tends to be more easily controlled within the desired range, and these are also easy to obtain and tend to improve the embedding property of the ink composition.

The acetylene glycol surfactant is not particularly limited, but for example at least one selected from alkylene oxide adducts with 2,4,7,9-tetramethyl-5-decyl-4,7-diol and 2,4,7,9-tetramethyl-5-decyl-4,7-diol, and alkylene oxide adducts with 2,4-dimethyl-5-decyl-4-ol and 2,4-dimethyl-5-decyl-4-ol is preferred. Commercial examples of acetylene glycol surfactants are not particularly limited, but include E series products such as the Olfine 104 series and Olfine E1010 (product names of Air Products Japan, Inc.), and Sufynol 465 and Sufynol 61 (product names of Nissin Chemical Industry Co., Ltd.). One kind of acetylene glycol surfactant alone or a combination of two or more may be used.

The fluorine surfactant is not particularly limited, but examples include perfluoroalkyl sulfonates, perfluoroalkyl carboxylates, perfluoroalkyl phosphate esters, perfluoroalkyl ethylene oxide adducts, perfluoroalkyl betaine and perfluoroalkylamine oxide compounds. Commercial examples of fluorine surfactants are not particularly limited, but include S-144 and S-145 (Asahi Glass Co., Ltd.); FC-170C, FC-430, and Fluorad FC4430 (Sumitomo 3M Limited); FSO, FSO-100, FSN, FSN-100 and FS-300 (DuPont); and FT-250 and 251 (NEOS Company Limited). One kind of fluorine surfactant alone or a combination of two or more may be used.

Examples of silicone surfactants include polysiloxane compounds, polyether-modified organosiloxanes and the like. Examples of commercial silicone surfactants are not particularly limited, but include BYK-306, BYK-307, BYK-333, BYK-341, BYK-345, BYK-346, BYK-347, BYK-348 and BYK-349 (all product names of BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015 and KF-6017 (all product names of Shin-Etsu Chemical Co., Ltd.).

The HLB of the surfactant is preferably from 6 to 15, or more preferably from 7 to 14, or still more preferably from 11 to 14, or especially from 11 to 13. If the HLB of the surfactant is within this range, the dissolution time will tend to be controlled within the desired range, and surfactants with HLBs within this range are easy available and tend to further improve the embedding property of the ink composition. "HLB" is an abbreviation for hydrophile-lipophile balance, as defined by the Griffin method.

The surface tension of the surfactant is preferably from 15 to 45 mN/m, or more preferably from 17.5 to 40 mN/m, or especially from 20 to 35 mN/m. If the surface tension of the surfactant is within this range, the embedding property of the ink composition tends to be improved. The surface tension (mN/m) can be measured at a liquid temperature of 25° C. by the Wilhelmy method using a surface tensiometer (such as a CBVP-Z surface tensiometer from Kyowa Interface Science Co., Ltd.).

The content of the surfactant is preferably from 0.3 to 3 mass %, or more preferably from 0.4 to 2 mass %, or especially from 0.5 to 1.6 mass % relative to the total mass (100 mass %) of the ink composition. If the content of the surfactant is not more than 3 mass %, the abrasion resistance and continuous discharge stability tend to be further improved. If the content is the surfactant is at least 0.3 mass %, meanwhile, the embedding property of the resulting recorded material is improved, and the continuous discharge stability also tends to be better. It is thought that continuous discharge stability is improved because resin adherence is suppressed, and the resin is easily detached if it does adhere, making it possible to efficiently remove resin deposits by head cleaning or the like, and because when the resin adheres, the adhering resin lumps are easily detached due to the presence of the surfactant around the resin and pigment.

1.3.4. Other Resin

The ink composition of this embodiment may contain resin such as a dispersion resin, water-soluble resin or the like. When a dispersion resin or water-soluble resin is included, the glossiness of the resulting image tends to be further improved. The dispersion resin is not particularly limited, but examples include polyvinyl alcohols, polyvinyl pyrrolidones, polyacrylic acid, acrylic acid-acrylonitrile copolymer, vinyl acetate-acrylic acid ester copolymer, acrylic acid-acrylic acid ester copolymer, styrene-acrylic acid copolymer, styrene-methacrylic acid copolymer, styrene-methacrylic acid-acrylic acid ester copolymer, styrene-α-methylstyrene-acrylic acid-acrylic acid copolymer, styrene-α-methylstyrene-acrylic acid-acrylic acid ester copolymer, styrene-maleic acid copolymer, styrene-maleic anhydride copolymer, vinyl naphthalene-acrylic acid copolymer, vinyl naphthalene-maleic acid copolymer, vinyl acetate-maleic acid ester copolymer, vinyl acetate-crotonic acid copolymer and vinyl acetate-acrylic acid copolymer, and salts of these. Of these, a styrene-acrylic acid copolymer is preferred. The copolymer may be in the form of a random copolymer, block copolymer, alternating copolymer or graft copolymer. The composition may contain, without limitation, a wax. Examples of waxes include polyolefin waxes such as polyethylene wax, and paraffin wax and the like.

1.3.5. Other Components

Various additives such as dissolution aids, viscosity adjusters, pH adjusters, antioxidants, preservatives, antiseptics, corrosion inhibitors and chelating agents for capturing metal ions that affect dispersion may be added appropriately to the ink composition of this embodiment in order to maintain good storage stability and discharge stability from the head, improve clogging, or prevent deterioration of the ink.

1.4. Method for Manufacturing Water-based Inkjet Ink Composition

The water-based inkjet ink composition of this embodiment can be obtained by mixing the aforementioned components (materials) in any sequence, and filtering as necessary to remove impurities. When the ink contains a pigment, this pigment is preferably dispersed uniformly in advance in a solvent before mixing in order to facilitate handling. A dispersant such as a dispersion resin is preferably used when preparing the pigment in advance in a dispersed state.

As the method for mixing the various materials, a method of adding the materials in sequence to a container equipped with a stirring device such as a mechanical stirrer or magnetic stirrer and stirring and mixing can be used by preference. Filtration can be performed as necessary by centrifugal filtration or with a filter or the like.

1.5. Physical Properties of Water-based Inkjet Ink Composition 1.5.1. Surface Tension The surface tension of the ink composition at 25° C. is preferably from 20 to 50 mN/m, or more preferably from 20 to 40 mN/m. If the surface tension is within this range, the discharge stability tends to be good. The surface tension can be measured at a liquid temperature of 25° C. by the Wilhelmy method using a surface tensiometer (such as a CBVP—Z surface tensiometer from Kyowa Interface Science Co., Ltd.).

1.5.2. Viscosity

The viscosity of the ink composition at 25° C. is preferably not more than 20 mPa·s, or more preferably not more than 10 mPa·s. If the viscosity is within this range, discharge stability tends to be good. The viscosity can be measured with a viscometer.

1.6. Use

The ink composition of this embodiment may be an ink composition for use in the inkjet recording methods described below, or an ink composition for use in the inkjet recording equipment described below.

2. Inkjet Recording Method

The inkjet recording method of this embodiment comprises a step of heating a recording medium, and an adherence step in which the water-based inkjet ink composition is discharged from a head and made to adhere to the recording medium heated in the heating step.

With the inkjet recording method of this embodiment, using the ink composition described above which contains the composite resin fine particle described above in the ink, continuous discharge stability is good because attachment of the composite resin fine particle to the nozzle of the recording head can be suppressed. Moreover, the composite resin fine particle dissolves rapidly when the recording medium is heat treated and forms a coating on the image recorded on the recording medium, thereby improving abrasion resistance.

The recording medium and recording equipment are explained below in the sequence of each step.

2.1. Recording Medium

The recording medium is not particularly limited, and examples included absorbent recording media, low-absorbent recording media and non-absorbent recording media. With the inkjet recording method of this embodiment, abrasion resistance is imparted by a coating that forms on the surface of the image. Consequently, it is more advantageous to use the inkjet recording method of the embodiment in order to improve abrasion resistance on a low-absorbent recording medium in which ink hardly permeates or a non-absorbent recording medium in which ink does not permeate rather than an absorbent recording medium in which ink permeates.

The absorbent recording medium is not particularly limited, but examples include inkjet paper and plain paper such as electrophotographic paper with high permeability to ink compositions, and art paper, coated paper, cast paper and the like used in ordinary offset printing, which have relatively low permeability to ink compositions. The inkjet paper is not particularly limited, and specific examples include papers having ink-absorbing layers composed of silica particles or alumina particles, and papers having ink-absorbing layers composed of hydrophilic polymers such as polyvinyl alcohol (PVA) and polyvinylpyrrolidone (PVP).

The low-absorbent recording medium is not particularly limited, and examples include coated papers provided with surface coating layers for receiving oil-based ink compositions. Examples of coated papers are not particularly limited, but include printing papers such as art paper, coated paper, matte paper and the like.

The non-absorbent recording medium is not particularly limited, but examples include plastic films and plates made of polyvinyl chloride, polyethylene, polypropylene, polyethylene terephthalate (PET) and the like, metal plates of iron, silver, copper, aluminum and the like, metal plates and plastic films manufactured by depositing these various metals, and plates made of alloys such as stainless steel and brass.

The "low-absorbent recording medium" and "non-absorbent recording medium" here are recording media having water absorption of not more than 10 mL/m$^2$ up to 30 msec after the start of contact by the Bristow method. The Bristow method is the most popular method for measuring liquid absorption, and is used by the Japan Technical Association of the Pulp and Paper Industry (Japan TAPPI). Detailed testing methods are described in the "Japan TAPPI Pulp and Paper Test Methods, 2000 Edition", standard No. 51, "Paper and Paperboard—Liquid Absorbency Testing Methods: Bristow Method".

Non-absorbent recording media and low-absorbent recording media can also be classified according to their wetting properties with respect to water on the recording surface. For example, the recording medium can be characterized by dropping an 0.5 μL water droplet onto the recording surface of the recording medium, and measuring the decrease in contact angle (comparing the contact angle 0.5 milliseconds after landing with the contact angle after 5 seconds). More specifically, in terms of the property of the recording medium, the non-absorbency of a "non-absorbent recording medium" is defined by a contact angle decrease of less than 1%, while the low absorbency of a "low-absorbent recording medium" is defined by a contact angle decrease of 1% or more and less than 5%. A decrease of 5% or more indicates that the medium is absorbent. The contact angle can be measured using a PCA-1 portable contact angle meter (Kyowa Interface Science Co., Ltd.).

2.2. Recording Device

An inkjet recording device that can be used in this embodiment comprises an inkjet head for discharging the ink composition onto the recording medium, a head heating means for heating the inkjet head, and a drying means for drying the recording medium with the ink composition adhering thereto.

FIG. 1 is a model cross-section illustrating the inkjet recording device. As illustrated in FIG. 1, the recording device 1 comprises an inkjet head 2, an IR heater 3, a platen heater 4, a hardening heater 5, a cooling fan 6, a pre-heater 7, and a ventilation fan 8.

The head heating means heats the inkjet head 2. The head heating means is not particularly limited, and may be for example a means of directly heating the inkjet head 2 with hot air or the IR heater 3, or a means of heating the inkjet head 2 via a recording medium that has been heated by the platen heater 4. Heating the inkjet head 2 causes the viscosity of the ink composition in the inkjet head 2 to decrease, so that it can be discharged satisfactorily.

When the IR heater 3 is used, the recording medium can be heated from the inkjet head 2 side. This means that the inkjet head 2 is also easily heated at the same time, but the rise in temperature is not affected by the thickness of the recording medium, as it is when the recording medium is heated from the reverse side with the platen heater 4 or the like. Using the platen heater 4, on the other hand, the recording medium can be heated from the side opposite the inkjet head 2. This means that inkjet head 2 is relatively unlikely to be heated.

The recording device 1 is preferably equipped with a recording medium heating means that heats the recording medium to a surface temperature of 20° C. to 70° C. when the ink composition is discharged onto the recording medium. The recording medium heating means is not particularly limited, but examples include the IR heater 3 and the platen heater 4. Because there is a recording medium heating means, the composite resin fine particle adhering to the recording medium can be dissolved more rapidly to form a uniform coating.

The drying means heats and dries the recording medium with the ink composition adhering thereto. The drying means is not particularly limited, and examples include hardening heater 5, a hot air mechanism (not shown) and a thermostatic tank (not shown) and the like. By heating the recording medium with the image recorded thereon, the drying means causes the moisture contained in the ink composition to evaporate and scatter more rapidly, so that a coating is formed by the composite resin fine particle contained in the ink composition. It is thus possible to strongly fix (attach) the dried ink onto the recording medium, and obtain a high-quality image with excellent abrasion resistance in a short amount of time.

"Heating the recording medium" here means raising the temperature of the recording medium to a desired temperature, and does not necessarily mean directly heating the recording medium.

The recording device 1 may also having a cooling fan 6. After drying, the ink composition tends to form a good adhesive coating on the recording medium if it is cooled on the recording medium by the cooling fan 6.

The recording device 1 may also have a pre-heater 7 that pre-heats the recording medium before the ink composition is discharged onto the recording medium. When the recording medium is pre-heated prior to the discharge of the ink composition, it tends to be possible to form a high-quality image with little bleeding on the recording medium, particularly in the case of a non-absorbent or low-absorbent recording medium. The pre-heating temperature is preferably from 80° C. to 120° C.

The recording device 1 may also have a ventilation fan 8 for more efficiently drying the ink composition adhering to the recording medium.

2.3. Steps of Inkjet Recording Method 2.3.1. Heating Step

This is a step of heating the recording medium. In the heating step, heating is performed so that the maximum surface temperature of the recording medium is preferably not more than 70° C., or still more preferably not more than 50° C., or yet more preferably not more than 45° C., or most preferably not more than 40° C., or especially not more than 38° C. The lower limit of the surface temperature of the recording medium is preferably at least 20° C., or more preferably at least 25° C., or especially at least 30° C. If the surface temperature of the recording medium is not more than 70° C., heating of the inkjet head is suppressed, nozzle dropout is suppressed during printing, and continuous discharge stability tends to be further improved. If the surface temperature of the recording medium is at least 20° C., on the other hand, the embedding property of the dots of the ink composition on the recording medium is further improved, especially in the case of non-absorbent recording media such as vinyl chloride, and the image quality tends to be further improved.

Using this recording device 1, the surface temperature of the recording medium can be controlled using either or both of the IR heater 3 and the platen heater 4.

2.3.2. Adhering Step

This is a step of discharging the ink composition from the head and causing it to adhere to the recording medium heated in the heating step. For example, when the inkjet head 2 is heated by the head heating means discussed above, the viscosity of the ink composition in the inkjet head 2 declines, improve the continuous discharge stability of the ink.

Figure 2:
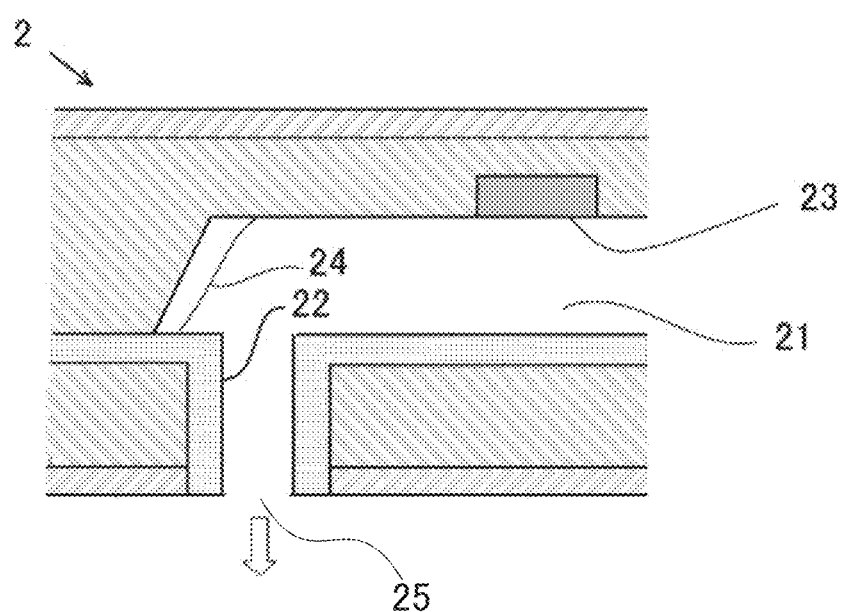
FIG. 2 is an enlarged cross-sectional view illustrating an inkjet head.

FIG. 2 is an enlarged cross-section schematically illustrating the inkjet head 2. The inkjet head 2 comprises a pressure chamber 21 and an element 23 that applies pressure to an ink composition inside the pressure chamber 21 to discharge it from the nozzle 22, and, in the pressure chamber 21, the element 23 is disposed in a location that does not face the outlet through which the water-based ink composition moves towards the nozzle 22. In terms of the force pushing the ink out of the nozzle, positioning the element 23 directly over the nozzle would be advantageous from the standpoint of resolving the problem of resin deposit 24, but this is not desirable for reasons of head design, and the invention is especially useful in such cases in which positioning the element 23 in a location not directly above the nozzle is advantageous from a design standpoint. The element 23 can be formed using an electromechanical conversion element such as a piezoelectric element that changes the volume of the cavity by mechanical deformation, or using an electrothermal transducer that emits heat to generate bubbles in the ink and eject the ink or the like.

Supposing lines extending toward the upper part of the drawings from the wall of the outlet 25 in FIG. 1, the position opposite the outlet 25 communicating with the nozzle 22 in the pressure chamber 21 is a region comprising these extension lines and the area surrounded by these extension lines. In the case of the head illustrated in FIG. 1 for example, the outlet 25 is the part where the area in the direction perpendicular to the direction of ink discharge is the same as the nozzle 22. If the element 23 is positioned in another location, this means that at least part of the element 23 is not in at least part of this region. This is desirable because it allows more freedom in designing the piezoelectric element and pressure chamber.

Preferably recording is performed for at least 1 hour without a step of applying external pressure to the inkjet head 2 to eliminate the ink composition from the nozzle. The externally applied pressure is suction (negative pressure) or positive pressure applied from upstream of the head, and is distinct from ink elimination (flushing) performed by the intrinsic function of the head. As long as the ink is not eliminated by application of external pressure, printing does not need to be continued, and may be interrupted. In this case, the cumulative recording time is at least 1 hour. This recording time is preferably 1 to 4 hours, or more preferably 2 to 3 hours. The effects of this embodiment can be more fully realized because resin is relatively likely to be deposited with such an inkjet recording method. When recording times, it is better to not to perform a step of eliminating the ink composition from the nozzle by application of external to the inkjet head 2 during printing. It is also desirable to perform a step of eliminating the ink composition from the nozzle by application of external pressure to the inkjet head 2 at least either before or after recording. This is desirable because the recording speed can be faster, and the effects of the embodiment are further realized, resulting in even better discharge stability.

2.3.3. Drying Step

The inkjet recording method of this embodiment may also have a drying step after the adhering step, in which the recording medium with the ink composition adhering thereto is dried. It is thus possible to dissolve the composite resin fine particle contained in the ink composition on the recording medium, and form a recorded material with a good embedding property. The surface temperature of the recording medium in this drying step is preferably from 50° C. to 150° C., or more preferably from 70° C. to 120° C., or still more preferably from 80° C. to 100° C. Abrasion resistance tends to be further improved if the drying temperature is within this range.

3. Examples

The invention is explained in more detail below by means of examples and comparative examples, but the invention is not limited to these examples. Unless otherwise specified, "parts" and "%" values in the examples and comparative examples below are based on mass.

3.1. Manufacture of Composite Resin Fine Particle 3.1.1. Manufacturing Example 1

2600 g of ion-exchange water and 0.5 g of sodium lauryl sulfate were loaded into a reactor equipped with a stirrer, a reflux condenser, a dropping device and a thermometer, and the temperature was raised to 70° C. under stirring while purging with nitrogen. The internal temperature was maintained at 70° C. as 4 g of potassium persulfate as a polymerization initiator were added and dissolved, after which an emulsion prepared by previously adding 2 g of acrylamide, 180 g of methyl methacrylate, 25 g of butyl acrylate and 2 g of methacrylic acid under stirring to 300 g of ion-exchanger water and 0.5 g of sodium lauryl sulfate was added dropwise to the reaction solution continuously over the course of 3 hours. After completion of dropping, this was matured for 1 hour. After maturation was complete, an emulsion previously prepared by adding 30 g of acrylamide, 1200 g of styrene, 200 g of 2-ethylhexyl methacrylate and 30 g of methacrylic acid under stirring to 500 g of ion-exchange water and 1.5 g of sodium lauryl sulfate was added dropwise to the reaction solution continuously over the course of 4 hours. After completion of dropping, this was matured for 3 hours. The resulting water-based emulsion was cooled to room temperature, and ion-exchange water and sodium hydroxide water were added to adjust the solids to 30 wt % and the pH to 8. The resulting particle had a sea-island structure. A resin fine-particle without crosslinking was manufactured in this way.

3.1.2. Manufacturing Example 2

2600 g of ion-exchange water and 0.5 g of sodium lauryl sulfate were loaded into a reactor equipped with a stirrer, a reflux condenser, a dropping device and a thermometer, and the temperature was raised to 70° C. under stirring while purging with nitrogen. The internal temperature was maintained at 70° C. as 4 g of potassium persulfate as a polymerization initiator were added and dissolved, after which an emulsion prepared by previously adding 2 g of acrylamide, 180 g of methyl methacrylate, 25 g of butyl acrylate and 2 g of methacrylic acid under stirring to 300 g of ion-exchanger water and 0.5 g of sodium lauryl sulfate was added dropwise to the reaction solution continuously over the course of 3 hours. After completion of dropping, this was matured for 1 hour. After maturation was complete, an emulsion prepared by previously adding 30 g of acrylamide, 1200 g of styrene, 200 g of 2-ethylhexyl methacrylate, 30 g of methacrylic acid and 15 g of ethylene glycol dimethacrylate under stirring to 500 g of ion-exchange water and 1.5 g of sodium lauryl sulfate was added dropwise to the reaction solution continuously over the course of 4 hours. After completion of dropping, this was matured for 3 hours. The resulting water-based emulsion was cooled to room temperature, and ion-exchange water and sodium hydroxide water were added to adjust the solids to 30 wt % and the pH to 8. The resulting particle had a core-shell structure. A resin fine particle having a crosslinked first resin (shell) was manufactured in this way.

Using Manufacturing Example 1 as the basis of the non-crosslinked resin fine particles and Manufacturing Example 2 as the basis of the resin fine particles having crosslinked first resins, the types and mass amounts of the individual monomers were adjusted to manufacture resin fine particles having the various physical property values of the examples shown in Table 2. The presence or absence and degree of crosslinking in Table 2 are shown for the first resins, while the second resins are not crosslinked. The glass transition temperatures Tg (° C.) of the resins of the resulting composite resin fine particles were calculated as described above.

The composite resin fine particles obtained above were also measured with a Microtrac UPA (Nikkiso Co., Ltd.) to determine the average particle diameter (nm) of each composite resin fine particle. The SP values of the first and second resin and the acid values and crosslinking rates of the composite resin fine particle were also determined by the methods described above under "1. Water-based Inkjet Ink Composition". The mass ratio of the first and second resins was determined from the masses of the monomers used in manufacturing the composite resin fine particle.

3.2. Preparation of Water-Based Inkjet Ink Composition

The materials were mixed in the proportions shown in Table 1 below, and thoroughly stirred to obtain a water-based inkjet ink composition. In Table 1 below, the numbers represent mass %, for a total of 100 mass %.

TABLE 1

| Ink composition (mass %) | | |
|---|---|---|
| Composite resin fine particle solids | Composite resin fine particle of each manufacturing example | 3 |
| Pigment solids | C.I. Pigment Blue 15:3 | 4 |
| Dispersion resin | Styrene-acrylic acid water-soluble resin (Tg: 55° C.) | 1 |
| Wax solids | Polyethylene wax (Aquacer 515 from BYK Japan KK) | 1 |
| Organic solvents | 2-pyrrolidone | 15 |
| | 1,3-butanediol | 6 |
| | 1,2-hexanediol | 6 |
| Surfactant | Olfine E1010 (Nissin Chemical Industry Co., Ltd) | 2 |
| | Water | Remainder |
| | Total | 100 |

3.3. Evaluation Methods 3.3.1. Inkjet Recording Method

A modified inkjet printer equipped with a platen heater and the inkjet head illustrated in FIG. 2 (product name PX-G930, Seiko Epson Corporation) was used as the recording device. One of the nozzles of a nozzle row of the recording device head (1 nozzle row=180 nozzles) was filled with each of the water-based inkjet ink compositions prepared above, which was then discharged onto a glossy polyvinyl chloride sheet (Roland DG Corporation, model SV-G-1270G) and attached to a coverage of 12 mg/inch at a resolution of 720 dpi×720 dpi. During this printing, the platen heater was operated so that the surface temperature of the recording medium during primary drying was 35° C. The recording medium discharged from the recording device was subjected to secondary drying for 2 minutes in an oven at 100° C.

3.3.2. Evaluation of OD Value

After printing, the recorded material was left for 1 hour in a normal environment, after which the OD value of the solid part was measured with a Gretag densitometer (GretagMacbeth GmbH). The resulting OD value was then evaluated based on the following evaluation standard.

Evaluation Standard

A: OD value over 1.9

B: OD value 1.6 to 1.9

C: OD value below 1.6

3.3.3. Evaluation of Abrasion Resistance

The recorded material obtained as described above was tested by passing a #3 unbleached muslin cloth back and forth under 500 g of load (JIS P 8136) with an AB-301 Color Fastness Rubbing Tester (Tester Sangyo Co., Ltd.). Abrasion resistance was evaluated based on the following evaluation standard.

Evaluation Standard

A: No scratching or peeling

B: Scratching or peeling equaling 1% or less of stroke area

C: Scratching or peeling equaling more than 1% of stroke area 3.3.4. Evaluation of Foreign Material The water-based inkjet ink composition obtained above was enclosed in a polyethylene ink pack and left for 6 days at 70° C., and 10 cc was taken and tested by passing it through an A filter. 10 mL was passed through a #4300 metal mesh filter, and the presence or absence of foreign matter on the filter was confirmed.

Evaluation Standard
A: No foreign matter
B: Foreign matter covering 10% or less of filter area
C: Foreign matter covering more than 10% of filter area
3.3.5. Evaluation of Continuous Discharge Stability Recording was performed by the aforementioned inkjet recording method. First, the nozzle surfaces were wiped lightly 2 or 3 times with a cloth, and about half of the nozzles that no longer discharged ink were provided in the nozzle row. Leaving these non-discharging nozzles as is, printing was performed continuously for 2 hours without suction cleaning. Printing was performed with the room containing the printer at an environment of 35° C., 20% RH, and discharge stability was tested as follows after printing. Continuous discharge stability was then evaluated according to the following evaluation standard. Separately, when suction cleaning was performed once immediately before printing as above with about half of the nozzles that no longer discharged ink provided in the nozzle row, all nozzles recovered in all rows.

Evaluation Standard
A: All nozzles recovered with one suction cleaning, or all nozzles were normal without suction cleaning
B: All nozzles recovered with two suction cleanings
C: All nozzles recovered with three suction cleanings
D: Some nozzles did not recover with three suction cleanings 3.4. Evaluation Results The evaluation results for the physical properties of the composite resin fine particles used in the examples and comparative examples are shown in Table 2 below.

TABLE 2

| | Composite resin fine particle | | | | | | | | |
|---|---|---|---|---|---|---|---|---|---|
| | Average particle diameter (nm) | 2nd resin Tg (° C.) | 1st resin Tg (° C.) | 2nd resin SP value | 1st resin SP value | Acid value mgKOH/g dry | Mass ratio 1st resin/2nd resin | Composite resin fine particle SP value | 2nd resin SP value − 1st resin SP value |
| Ex. 1 | 192 | 80 | 80 | 11.15 | 10.83 | 13 | 1/11 | 10.86 | 0.32 |
| Ex. 2 | 235 | 80 | 80 | 11.15 | 10.83 | 13 | 1/11 | 10.86 | 0.32 |
| Ex. 3 | 253 | 80 | 80 | 11.15 | 10.83 | 13 | 1/11 | 10.86 | 0.32 |
| Ex. 4 | 195 | 80 | 80 | 11.15 | 10.62 | 13 | 1/11 | 10.66 | 0.53 |
| Ex. 5 | 204 | 80 | 80 | 11.15 | 10.62 | 13 | 1/11 | 10.66 | 0.53 |
| Ex. 6 | 208 | 80 | 80 | 11.15 | 10.62 | 13 | 1/11 | 10.66 | 0.53 |
| Ex. 7 | 199 | 80 | 80 | 11.15 | 10.93 | 13 | 1/11 | 10.95 | 0.22 |
| Ex. 8 | 193 | 80 | 80 | 11.15 | 11.02 | 13 | 1/11 | 11.03 | 0.13 |
| Ex. 9 | 213 | 80 | 80 | 11.15 | 10.83 | 13 | 1/7 | 10.87 | 0.32 |
| Ex. 10 | 191 | 80 | 80 | 11.15 | 10.83 | 13 | 1/7 | 10.87 | 0.32 |
| Ex. 11 | 194 | 80 | 80 | 11.15 | 10.83 | 13 | 1/3 | 10.91 | 0.32 |
| Ex. 12 | 195 | 80 | 80 | 11.15 | 10.83 | 13 | 1/2 | 10.94 | 0.32 |
| Ex. 13 | 211 | 80 | 80 | 11.15 | 10.83 | 32.5 | 1/11 | 10.86 | 0.32 |
| Ex. 14 | 210 | 80 | 80 | 11.15 | 10.83 | 19.5 | 1/11 | 10.86 | 0.32 |
| Ex. 15 | 164 | 80 | 80 | 11.15 | 10.83 | 19.5 | 1/11 | 10.86 | 0.32 |
| Ex. 16 | 203 | 80 | 80 | 11.15 | 11.02 | 19.5 | 1/11 | 11.03 | 0.13 |
| Ex. 17 | 164 | 90 | 80 | 11.18 | 10.83 | 19.5 | 1/11 | 10.86 | 0.35 |
| Ex. 18 | 202 | 80 | 80 | 11.15 | 10.83 | 6.5 | 1/11 | 10.86 | 0.32 |
| Ex. 19 | 208 | 80 | 80 | 11.15 | 10.83 | 13 | 1/11 | 10.86 | 0.32 |
| Ex. 20 | 262 | 80 | 80 | 11.15 | 10.83 | 13 | 1/11 | 10.86 | 0.32 |
| Ex. 21 | 287 | 80 | 80 | 11.11 | 10.83 | 13 | 1/11 | 10.85 | 0.28 |
| Ex. 22 | 199 | 80 | 80 | 11.15 | 10.62 | 13 | 1/11 | 10.66 | 0.53 |
| Ex. 23 | 193 | 80 | 80 | 11.15 | 10.83 | 13 | 1/11 | 10.86 | 0.32 |
| Ex. 24 | 198 | 80 | 80 | 11.15 | 10.83 | 13 | 1/11 | 10.86 | 0.32 |
| Ex. 25 | 202 | 80 | 80 | 11.15 | 10.83 | 13 | 1/11 | 10.86 | 0.32 |
| Ex. 26 | 199 | 65 | 80 | 11.15 | 10.83 | 13 | 1/11 | 10.86 | 0.32 |
| Ex. 27 | 194 | 10 | 80 | 11.15 | 10.83 | 13 | 1/11 | 10.86 | 0.32 |
| Ex. 28 | 193 | 80 | 60 | 11.15 | 10.83 | 13 | 1/11 | 10.86 | 0.32 |
| Ex. 29 | 202 | 80 | 90 | 11.15 | 10.83 | 13 | 1/11 | 10.86 | 0.32 |
| CE 1 | 281 | 80 | — | 10.83 | — | 13 | — | 10.83 | — |
| CE 2 | 196 | 80 | — | 10.83 | — | 13 | — | 10.83 | — |
| CE 3 | 197 | 80 | — | 11.15 | — | 13 | — | 11.15 | — |
| CE 4 | 199 | 80 | 80 | 11.15 | 11.25 | 13 | 1/11 | 11.24 | −0.10 |
| CE 5 | 198 | 80 | 80 | 10.73 | 10.83 | 13 | 1/11 | 10.82 | −0.10 |
| CE 6 | 198 | 80 | 80 | 13.15 | 12.85 | 13 | 1/11 | 12.88 | 0.30 |
| CE 7 | 199 | 80 | 80 | 8.95 | 8.65 | 13 | 1/11 | 8.68 | 0.30 |

| | Composite resin fine particle | | Evaluation result | | | |
|---|---|---|---|---|---|---|
| | Cross-linking | Cross-linking rate (mol %) | OD | Abrasion resistance | Foreign matter | Continuous discharge stability |
| Ex. 1 | Yes | 0.8 | A | A | A | A |
| Ex. 2 | Yes | 0.8 | A | A | A | A |

TABLE 2-continued

| | | | | | | |
|---|---|---|---|---|---|---|
| Ex. 3 | Yes | 0.8 | B | B | A | A |
| Ex. 4 | Yes | 0.8 | A | B | A | A |
| Ex. 5 | Yes | 0.8 | A | B | A | A |
| Ex. 6 | Yes | 0.8 | A | B | A | A |
| Ex. 7 | Yes | 0.8 | A | A | A | B |
| Ex. 8 | Yes | 0.8 | A | A | B | C |
| Ex. 9 | Yes | 0.8 | A | A | A | A |
| Ex. 10 | Yes | 0.8 | A | A | A | A |
| Ex. 11 | Yes | 0.8 | A | A | A | B |
| Ex. 12 | Yes | 0.8 | A | A | B | C |
| Ex. 13 | Yes | 0.8 | A | B | B | C |
| Ex. 14 | Yes | 0.8 | A | B | A | A |
| Ex. 15 | Yes | 0.8 | A | B | A | B |
| Ex. 16 | Yes | 0.8 | A | B | A | C |
| Ex. 17 | Yes | 0.8 | A | B | A | B |
| Ex. 18 | Yes | 0.8 | A | A | B | A |
| Ex. 19 | None | 0 | A | A | B | C |
| Ex. 20 | None | 0 | B | B | A | B |
| Ex. 21 | None | 0 | B | B | A | B |
| Ex. 22 | None | 0 | A | B | A | B |
| Ex. 23 | Yes | 0.4 | A | A | A | B |
| Ex. 24 | Yes | 0.6 | A | A | A | B |
| Ex. 25 | Yes | 0.3 | B | B | A | A |
| Ex. 26 | Yes | 0.8 | A | A | B | B |
| Ex. 27 | Yes | 0.8 | A | B | A | C |
| Ex. 28 | Yes | 0.8 | A | B | A | C |
| Ex. 29 | Yes | 0.8 | A | A | B | A |
| CE 1 | None | 0 | B | C | A | A |
| CE 2 | None | 0 | A | C | A | A |
| CE 3 | Yes | 0.8 | A | A | C | D |
| CE 4 | Yes | 0.8 | A | A | B | D |
| CE 5 | Yes | 0.8 | C | C | B | A |
| CE 6 | Yes | 0.8 | A | A | C | D |
| CE 7 | Yes | 0.8 | C | C | A | A |

The results of the evaluation show that in all the examples that were water-based inkjet ink compositions containing composite resin fine particles composed of a first resin and a second resin, and having an SP value of from 9.0 to 12.0 $(cal/cm^3)^{1/2}$, wherein the SP value of the second resin was higher than the SP value of the first resin, and the first resin had a higher mass than the second resin, the continuous discharge stability and abrasion resistance were both excellent. By contrast, in all of the comparative examples using water-based inkjet ink compositions lacking these features, the continuous discharge stability or abrasion resistance were inferior in all cases.

Specifically, a comparison of Example 1 with Example 3 shows that the abrasion resistance and OD value were especially good when the average particle diameter of the composite resin fine particle was relatively small.

A comparison of Examples 4 to 8 and 1 shows that the abrasion resistance was especially good when the SP value of the first resin was higher, while the continuous discharge stability and foreign matter reduction were particularly excellent when it was lower.

A comparison of Examples 9 to 12 shows that the continuous discharge stability and foreign matter reduction were particularly excellent the smaller the mass of the second resin.

A comparison of Examples 13 to 18 and 1 shows that the continuous discharge stability and foreign matter reduction were particularly good and abrasion resistance was also excellent when the acid value of the resin fine particle was relatively low, while on the other hand the foreign matter reduction was particularly excellent if the acid value was not too low.

A comparison of Examples 19 to 25 and 1 shows that the continuous discharge stability and foreign matter reduction were particularly excellent when the crosslinking rate of the first resin was high, while the abrasion resistance and OD value were particularly good when the crosslinking rate was low. Examples 20 to 22 show that lowering the crosslinking rate in order to obtain especially high abrasion resistance can be useful because in this case excellent continuous discharge stability and foreign matter reduction can also be obtained by adjusting the other physical properties such as the average particle diameter of the resin fine particle and the SP values of the second and first resin. Although not described in the table, when recording was performed in the same way with the secondary drying temperature set to 95° C.×1 minute, abrasion resistance tended to decline in all cases, but in Examples 19 to 22 the evaluation of abrasion resistance was still A or B. This shows that a lower crosslinking rate is desirable from the standpoint of maintaining excellent abrasion resistance in cases in which abrasion resistance is likely to decline, such as when the secondary drying temperature is not stable.

A comparison of Examples 26 to 29 and 1 shows that the continuous discharge resistance was especially good when the Tg of the first resin was high, while foreign matter reduction was excellent when the Tg was low. Continuous discharge stability, foreign matter reduction and abrasion resistance were all especially good when the Tg of the second resin was high.

By contrast, Comparative Examples 1 to 3 are examples of resin fine particles consisting of a single resin, and abrasion resistance at least was inferior in Comparative Examples 1 and 2. Continuous discharge stability at least was inferior in Comparative Example 3.

Comparative Examples 4 and 5 are examples of resin fine particles in which the SP value of the resin with the higher mass ratio was no lower than the SP value of the resin with the smaller mass ratio, and the continuous discharge stability was inferior in Comparative Example 4, while in Comparative Example 5 the abrasion resistance was inferior.

In Comparative Example 6, in which the SP value of the resin fine particle exceeded 12, the continuous discharge stability was inferior.

In Comparative Example 7, in which the SP value of the resin fine particle was less than 9, the abrasion resistance was inferior.

The invention is not limited to the examples described above, and various modifications are possible. For example, the invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A water-based inkjet ink composition comprising composite resin fine particles composed of a first resin and a second resin, and having an SP value of from 9.0 to 12.0 $(cal/cm^3)^{1/2}$, wherein the SP value of the second resin is higher than the SP value of the first resin, and the first resin has a higher mass than the second resin, wherein the SP value of the second resin is 11.0 to 12.0 $(cal/cm^3)^{1/2}$, and the SP value of the first resin is from 9.0 to 11.5 $(cal/cm^3)^{1/2}$, and wherein the SP values are calculated using Fedors formula.

2. A water-based inkjet ink composition comprising composite resin fine particles composed of a first resin and a second resin, and having an SP value of from 9.0 to 12.0 $(cal/cm^3)^{1/2}$, wherein the SP value of the second resin is higher than the SP value of the first resin, and the first resin has a higher mass than the second resin, wherein the glass transition temperature of the first resin is from 60° C. to 95° C., and wherein the SP values are calculated using Fedors formula.

3. A water-based inkjet ink composition comprising composite resin fine particles composed of a first resin and a second resin, and having an SP value of from 9.0 to 12.0 $(cal/cm^3)^{1/2}$, wherein the SP value of the second resin is higher than the SP value of the first resin, and the first resin has a higher mass than the second resin, wherein the mass ratio of the second resin to the first resin (mass of second resin/mass of first resin) is from 1/11 to 1/2 in the composite resin fine particle, and wherein the SP values are calculated using Fedors formula.

4. A water-based inkjet ink composition comprising composite resin fine particles composed of a first resin and a second resin, and having an SP value of from 9.0 to 12.0 $(cal/cm^3)^{1/2}$, wherein the SP value of the second resin is higher than the SP value of the first resin, and the first resin has a higher mass than the second resin, wherein the average particle diameter of the composite resin fine particle is from 100 to 300 nm, and wherein the SP values are calculated using Fedors formula.

5. A water-based inkjet ink composition comprising composite resin fine particles composed of a first resin and a second resin, and having an SP value of from 9.0 to 12.0 $(cal/cm^3)^{1/2}$, wherein the SP value of the second resin is higher than the SP value of the first resin, and the first resin has a higher mass than the second resin, wherein the acid value of the composite resin fine particle is from 5 to 35 mgKOH/g, and wherein the SP values are calculated using Fedors formula.

6. The water-based inkjet ink composition according to claim 1, wherein the composite resin fine particle has a phase separation structure of the first resin and second resin.

7. A water-based inkjet ink composition comprising composite resin fine particles composed of a first resin and a second resin, and having an SP value of from 9.0 to 12.0 $(cal/cm^3)^{1/2}$, wherein the SP value of the second resin is higher than the SP value of the first resin, and the first resin has a higher mass than the second resins, wherein the phase separation structure is at least either a core-shell structure in which the first resin forms the shell and the second resin forms the core, or a sea-island structure in which the second resin exists in the form of islands in the first resin, and wherein the SP values are calculated using Fedors formula.

8. The water-based inkjet ink composition according to claim 1, wherein the water-based inkjet ink composition further contains a cyclic amide as an organic solvent.

9. The water-based inkjet ink composition according to claim 1, wherein the content of an organic solvent with a standard boiling point above 280° C. is equal to or less than 5 mass %, and further containing an organic solvent with a standard boiling point of from 150° C. to 260° C.

10. The water-based inkjet ink composition according to claim 2, wherein the composite resin fine particle has a phase separation structure of the first resin and second resin.

11. The water-based inkjet ink composition according to claim 3, wherein the composite resin fine particle has a phase separation structure of the first resin and second resin.

12. The water-based inkjet ink composition according to claim 4, wherein the composite resin fine particle has a phase separation structure of the first resin and second resin.

13. The water-based inkjet ink composition according to claim 5, wherein the composite resin fine particle has a phase separation structure of the first resin and second resin.

14. The water-based inkjet ink composition according to claim 7, wherein the composite resin fine particle has a phase separation structure of the first resin and second resin.

15. The water-based inkjet ink composition according to claim 2, wherein the water-based inkjet ink composition further contains a cyclic amide as an organic solvent.

16. The water-based inkjet ink composition according to claim 3, wherein the water-based inkjet ink composition further contains a cyclic amide as an organic solvent.

17. The water-based inkjet ink composition according to claim 4, wherein the water-based inkjet ink composition further contains a cyclic amide as an organic solvent.

18. The water-based inkjet ink composition according to claim 5, wherein the water-based inkjet ink composition further contains a cyclic amide as an organic solvent.

19. The water-based inkjet ink composition according to claim 7, wherein the water-based inkjet ink composition further contains a cyclic amide as an organic solvent.

20. The water-based inkjet ink composition according to claim 2, wherein the content of an organic solvent with a standard boiling point above 280° C. is equal to or less than 5 mass %, and further containing an organic solvent with a standard boiling point of from 150° C. to 260° C.

21. The water-based inkjet ink composition according to claim 3, wherein the content of an organic solvent with a standard boiling point above 280° C. is equal to or less than 5 mass %, and further containing an organic solvent with a standard boiling point of from 150° C. to 260° C.

22. The water-based inkjet ink composition according to claim 4, wherein the content of an organic solvent with a standard boiling point above 280° C. is equal to or less than 5 mass %, and further containing an organic solvent with a standard boiling point of from 150° C. to 260° C.

23. The water-based inkjet ink composition according to claim 5, wherein the content of an organic solvent with a standard boiling point above 280° C. is equal to or less than 5 mass %, and further containing an organic solvent with a standard boiling point of from 150° C. to 260° C.

24. The water-based inkjet ink composition according to claim 7, wherein the content of an organic solvent with a standard boiling point above 280° C. is equal to or less than 5 mass %, and further containing an organic solvent with a standard boiling point of from 150° C. to 260° C.

* * * * *